United States Patent [19]

Kawabe

[11] Patent Number: 4,824,045
[45] Date of Patent: Apr. 25, 1989

[54] SPINNING REEL
[75] Inventor: Yuzo Kawabe, Sakai, Japan
[73] Assignee: Shimano Industrial Company Limited, Osaka, Japan
[21] Appl. No.: 91,897
[22] Filed: Sep. 1, 1987
[30] Foreign Application Priority Data Sep. 3, 1986 [JP] Japan .............................. 61-134989

[51] Int. Cl.$^4$ .............................................. A01K 89/02
[52] U.S. Cl. .............................. 242/219; 242/84.51 R; 74/576
[58] Field of Search ................. 242/218, 219, 84.51 R, 242/84.2 R, 84.5 R; 74/576, 577.5

[56] References Cited

U.S. PATENT DOCUMENTS 3,075,721  1/1963  Sarah ................................. 74/576 X
4,540,135  9/1985  Uetsuki et al. ............... 242/84.51 R Primary Examiner—Stanley N. Gilreath
Assistant Examiner—Steven M. duBois
Attorney, Agent, or Firm—Stevens, Davis, Miller & Mosher

[57] ABSTRACT

A spinning reel is provided which includes a reel body, a driving shaft supported rotatably relative to the reel body, and anti-reverse rotation gear supported non-rotatably relative to the driving shaft to impede reverse rotation thereof, and a retaining pawl pivotally supported to the reel body for detachable engagement with the reverse rotation gear. A pawl control member is supported rotatably relative to the driving shaft and includes an impeding portion to impede the retaining pawl from engagement with the anti-reverse rotation gear and an engagement-allowing portion for allowing the retaining pawl to engage with the anti-reverse rotation gear. The pawl control member rotates substantially in concert with the driving shaft during at least a portion of a complete revolution of the driving shaft. An operating member is supported movably to the reel body to change the positions of the impeding portion and the engagement-allowing portion of the pawl control member with respect to the retaining pawl, so that alternatively the impeding portion prevents the retaining pawl from engaging with the anti-reverse rotation gear and the engagement-allowing portion allows the retaining pawl to make such engagement.

2 Claims, 2 Drawing Sheets

# 4,824,045

SPINNING REEL

FIELD OF THE INVENTION

The present invention relates to a spinning reel used for fishing, and more particularly, to a spinning reel in which is rotated a handle to drive a rotary frame, thereby winding a fishing line on a spool.

BACKGROUND OF THE INVENTION

Generally, a spinning reel, as disclosed in Japanese Utility Model Publication Gazette No. Sho 52-26,469, is provided at the drive shaft with an anti-reverse-rotation gear and includes a retaining pawl pivotally supported to a reel body. The retaining pawl is engageable with the anti-reverse-rotation gear, so that when the fishing line is wound up on the spool, the retaining pawl engages with the anti-reverse-rotation gear in a spring to prevent reverse rotation of the rotary frame and retaining pawl rises and falls with respect to the anti-reverse-rotation gear so as to generate sounds.

Conventionally, as disclosed in Japanese Utility Model Publication No. Sho 59-3,723, the drive shaft is provided with the anti-reverse-rotation gear, and retaining pawl is pivotally supported to the reel body. Also a coil spring operable by normal or reverse rotation of the driving shaft is wound onto the driving shaft, and the coil spring is retained at one end thereof to the retaining pawl moving in association with the coil spring. As a result when the fishing line is wound onto the spool, the coil spring allows the retaining pawl to shift to the engaging position and non-engaging position with respect to the anti-reverse-rotation gear.

Some anglers desire to hear a clicking sound of the fishing line exactly wound on the spool and some dislike hearing sounds or are axious about a possible loss of a fish due to the sounds.

However, for the reel for general use as disclosed in Japanese Utility Model Publication Gazette No. sho 52-26,469, the retaining pawl, when the line is wound ont the spool, rises and falls to always generate sounds, whereby such reel is not used by the angler disliking sound generation. Meanwhile, for the reel as disclosed in Japanese Utility Model Publication Gazette No. Sho 59-3,723, the retaining pawl, when the line is wound, shifts to the non-engageable position where no sound is generated, whereby such reel generating no sound is not used for the angler who likes sound generation.

SUMMARY OF THE INVENTION

An object of the present invention is to provide a spinning reel which, when the fishing line is wound, ensures prevention of reverse rotation of a rotary frame and also which provides the capability of selection, in accordance with an angler's preference, either (2) a mode employing a mechanism for generating sounds through a retaining pawl in engagement with an anti-reverse-rotation gear or (2) a mode in which the mechanism generates no sounds in which the retaining gear is shifted so as not to engage with the anti-revese-rotation gear. Furthermore, during use, the angler can select the retaining pawl mode as described above simply via an operating lever.

In a spinning reel provided with a reel body, a driving shaft supported rotatably thereto, an anti-reverse-rotation gear supported to the driving shaft for preventing reverse rotation thereof, and a retaining pawl pivotally supported to the reel body and detachably engageable with the anti-reverse-rotation gear, the present invention is characterized in that that driving shaft rotatably supports a pawl control member having an impeding portion which impedes engagement of the retaining pawl with the anti-reverse-rotation gear and an engagement-allowing portion which allows engagement of the pawl control member with the same. The pawl control member is rotatable following the normal or the reverse rotation of the driving shaft, and the reel body is provided with an operating member by which the pawl control member is displaceable with respect to the impeding portion and engagement-allowing portion.

In such construction, the operating member is operated to displace the impeding portion and engagement-allowing portion at the pawl control member with respect to the retaining pawl, and allow the engagement-allowing portion to correspond to the position of the retaining pawl, so that the retaining pawl engages with the anti-reverse-rotation gear, thereby generating sounds when the driving shaft normally rotates. Meanwhile, when the impeding portion corresponds to the position of the retaining pawl, the retaining pawl disengages from the anti-reverse-rotation gear, thereby generating no sounds.

The pawl control member is rotated following the reverse rotation of the driving shaft regardless of the position of the pawl control member when the driving shaft reversely rotates. Hence, the retaining pawl engages with the anti-reverse-rotation gear, thereby preventing the driving shaft from reversely rotating.

Thus, the spinning reel of the invention ensures the prevention of reverse rotation of the driving shaft when the fishing line is wound, and also provides for simple operation of the operating member to engage the retaining pawl with the anti-reverse-rotation gear to thereby generate sounds or to displace the pawl to the disengaging position from the anti-reverse-rotation gear to thereby generate no sounds, whereby the spinning reel can be selected according to the angler's preference in the use of the sound generating mechanism.

The above and further objects and novel features of the invention will be more fully apparent from the following detailed description when the same is read in connection with the accompanying drawings.

DETAILED DESCRIPTION OF THE INVENTION

Figure 1:
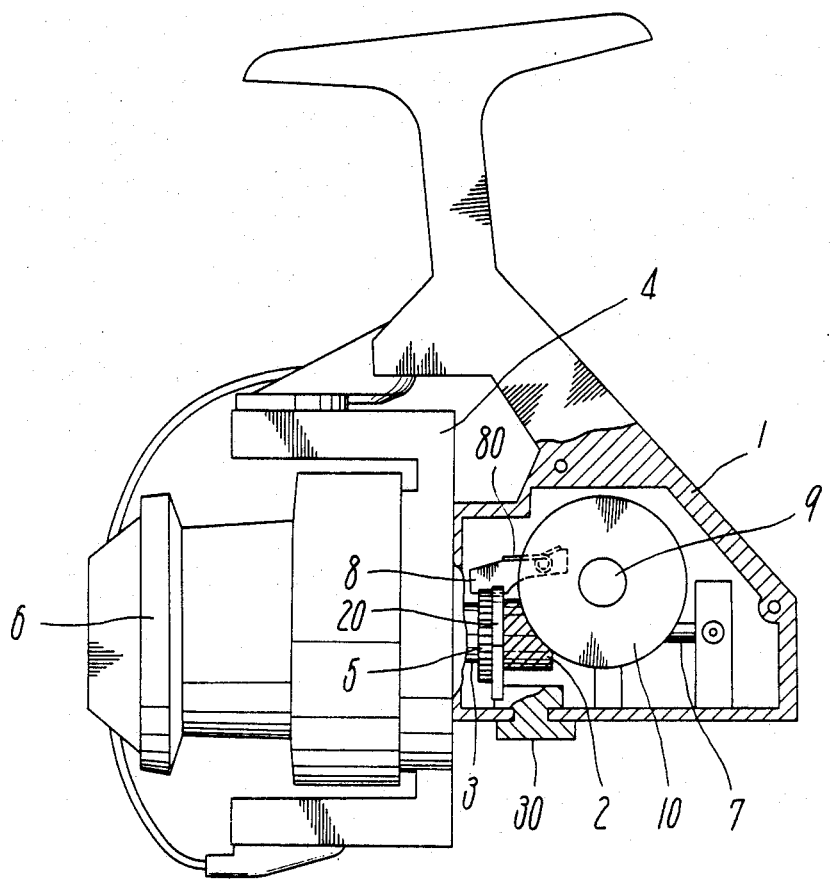
FIG. 1 is a partially cutaway side view of an embodiment of a spinning reel of the invention.

Referring to FIG. 1, a spinning reel is shown in which a tubular driving shaft 3 having a pinion 2 is supported rotatably to the front wall of a hollow reel body 1 through bearings. The utmost axial end of the driving shaft 3 projects forwardly from the front wall, and a rotary frame 4 having a bail arm is mounted on the outer periphery of the utmost end. On the outer periphery of the driving shaft 3 within the reel body 1 is mounted an anti-reverse-rotation gear 5 adjacent pinion 2. A spool shaft 7 having a spool 6 is supported longitudinally movably a shaft bore of the driving shaft 3, and a retaining pawl 8 engageable with the anti-reverse-rotation gear 5 is pivotally supported to a side wall of the reel body. A handle shaft 9 is supported rotatably to the side wall and supports at the projection in the reel body 1 a master gear 10 engageable with the pinion 2. A handle (not shown) is provided at the outward projection of the handle shaft 9 and is rotatably operated to drive the driving shaft 3 and rotate the rotary frame 4, thereby winding a fishing line on the spool 6. Between the retaining pawl 8 and the reel body 1 is provided a pawl spring 80 biasing the retaining pawl 8 toward the anti-reverse-rotation gear 5.

Figure 2:
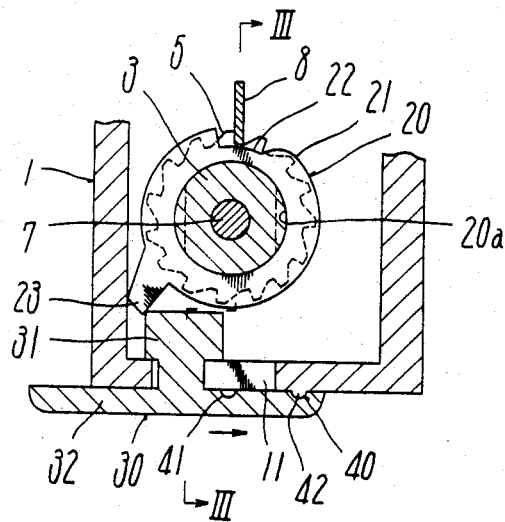
FIG. 2 is an enlarged sectional view of only the principal portion in the FIG. 1 embodiment.

At the outer periphery of the driving shaft 3 positioned in the reel body 1 and between the anti-reverse-rotation gear 5 and the pinion 2 is supported a pawl control member 20 to be discussed below. The pawl control member 20 has an impeding portion 21 for impeding engagement of the retaining pawl 8 with the anti-reverse-rotation gear 5, an engagement-allowing recessed portion 22 for allowing the retaining pawl 8 to engage with the anti-reverse-rotation gear 5 Pawl control member 20 is supported to the driving shaft 3 to be rotatable with respect thereto through a friction means. Thus, the pawl control member 20 rotates following the driving shaft 3 through frictional resistance given by the friction means due to the normal or reverse rotation of the driving shaft 3. At the bottom wall of the reel body 1 is provided a guide bore 11 extending axially of the driving shaft 3 as shown in FIG. 2, and in the guide bore 11 is movably provided an operating member 30 which engages with an engaging projection 23 at the pawl control member 20 to restrict an operating range thereof. Operating member 30 is used to change the position of the impeding portion 21 or the engagement-allowing portion 22 with respect to the retaining portion 8.

The pawl control member 20 is formed of a disc having a fitting bore 20a and is provided at its outer surface with the impeding portion 21 and engagement-allowing portion 22 in circumferential continuation of each other. An inner diameter of the fitting bore 20a is made equal to or slightly smaller than an outer diameter of the driving shaft 3 so as to apply a predetermined frictional resistance to the rotation of the pawl control member 20 with respect to the driving shaft 3. This frictional resistance allows the pawl control member 20 to rotate following normal or reverse rotation of the driving shaft 3.

The pawl control member 20, when the driving shaft 3 normally rotates, follows the rotation thereof and engages with the operating member 30; in this manner, the rotation range of control member 20 is regulated. When driving shaft 3 is reversely rotated, control member 30 follows the rotation thereof, until engaging projection 23 abuts against the inner surface of the side wall of reel body 1, thereby regulating a rotation range of the pawl control member 20.

In addition, the anti-reverse-rotation gear 5 is non-rotatable with respect to the driving shaft 3 due to flat locking faces 3a provided at the outer periphery of the driving shaft 3.

The operating member 30 is provided with an abutting portion 31 abutting against an engaging projection 23 and an operating portion 32 projecting outwardly from the reel body 1 and movable along the outer surface and radially within guide bore 11. Between the operating portion 32 and the reel body 1 is provided a positioning mechanism 40 comprising an engaging recess 41 and an engaging projection 42 engageable therewith, thereby enabling the operating member 30 to be maintained at its operating position.

Figure 3:
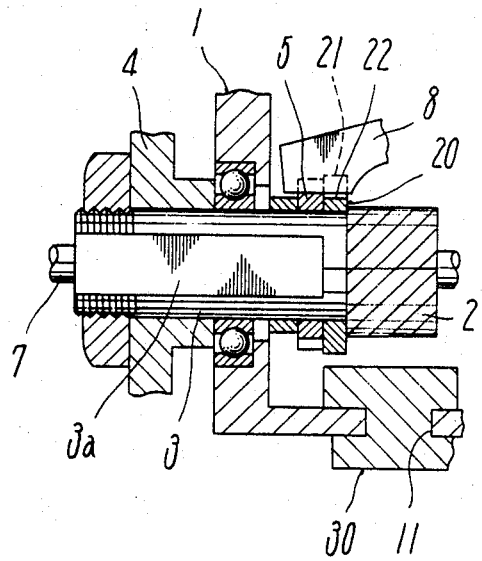
FIG. 3 is a sectional view taken on the line III—III in FIG. 2.
Figure 4:
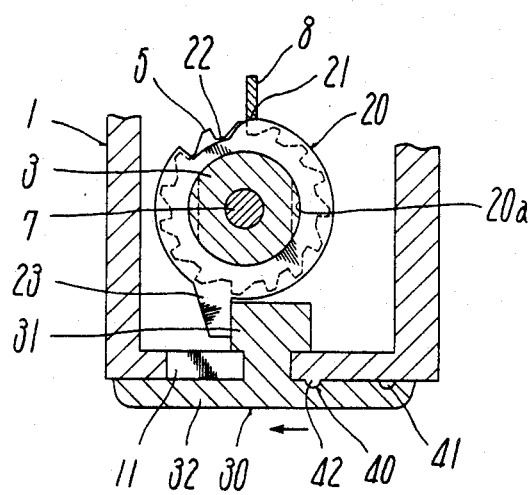
FIG. 4 is an enlarged sectional view showing the operating condition of the principal portion corresponding to FIG. 2.

Referring to FIGS. 2 and 3, the operating member 30 is operated leftwardly and the retaining pawl 8 engages with the anti-reverse-rotation gear 5 to generate sounds. In such condition, the operating member 30 is moved in the direction of the arrow in FIG. 2 and then positioned rightwardly as shown in FIG. 4. When the handle is operated to normally rotate the driving shaft 3, the pawl control member 20 follows the rotation of driving shaft 3 and rotates counterclockwise in FIG. 2, thereby shifting the positions of the impeding portion 21 and engagement-allowing portion 22 with respect to the retaining pawl 8. Namely, the engagement-allowing portion 22 moves from the position corresponding to the retaining pawl 8 and the position 8 impeding portion 21 now corresponds to pawl 8 so that the retaining pawl 8 disengages from the anti-reverse-rotation gear 5. Accordingly, the retaining pawl 8 becomes non-operable in the sense of to generating no sounds when the driving shaft 3 normally rotates. In this condition, the pawl control member 20 abuts at the engaging projection 23 against the operating member 30, thereby being impeded from further rotation.

For example, when the rotary frame 4 reversely rotates by tension acting on the fishing line, the pawl control member 20 reversely rotates clockwise in FIG. 4 following the reverse rotation of the driving shaft 3 through the frictional resistance to the driving shaft 3, and the retaining pawl 8 corresponds to the engagement allowable portion 22, thereby engaging with the anti-reverse-rotation gear 5. Hence, the reverse rotation of the rotary frame 4 is immediately impeded. In this case, the engaging projection 23 at the pawl control member 20 abuts against the side wall of reel body 1, thereby preventing the pawl control member 20 from further rotating.

In the condition where, as shown in FIG. 4, the retaining pawl 8 engages with the impeding portion 21 so as not to generate sounds when the fishing line is wound, the operating member 30 is moved in the direction of the arrow and the pawl control member 20 is forcibly rotated in a clockwise direction, thereby generating sounds by the retaining pawl 8. The rotation of the pawl control member 20 shifts the impeding portion 21 and engagement-allowing portion 22 with respect to the retaining pawl so that the retaining pawl 8 disengages from the impeding portion 21 and corresponds in position to the allowable portion 22, thereby engaging with the anti-reverse-rotation gear 5 as shown in FIG. 2. Hence, when the rotary frame 4 is normally rotated to wind the line onto the spool, the retaining pawl 8 rises and falls with respect to the anti-reverse-rotation gear 5, thereby generating sounds. When the rotary frame 4 is subjected to a torque in the reverse rotation direction by tension applied to the line, the retaining pawl 8 immediately impedes the reverse rotation of the rotary frame 4. In this condition, the operating member 30 and the side wall of reel body 1 impede the pawl control member 20 from rotation.

In the above-described construction, the pawl control member 20 is formed of a plate member so as to be inexpensive to produce. Alternatively, the same may be molded by synthetic resin or an aluminum alloy.

The operating member 30 slidably supported to the reel body 1 may alternatively have a cam-like-shaped abutting portion 31 so as to be pivotable or rotatable on reel body 1.

Alternatively, a frictional member, instead of the friction means, may be interposed between the fitting bore 20a and the driving shaft 3. Also alternatively, one or both of the inner periphery of the fitting bore 20a and the outer periphery of the driving shaft 3 may be formed to have a rough contour.

The regulating means for the rotation range of the pawl control member 20 may alternatively provide a separate stopper wall.

While preferred embodiment of the invention has been described using specific terms, such description is for illustrative purpose only, and it is to be understood that changes and variations may be made therefrom without departing from the spirit or scope of the following claims.

What is claimed is:

1. A spinning reel having a handle which is related to drive a rotary frame to wind a fishing line onto a spool, said reel comprising:
   a reel body;
   a handle shaft supported rotatably relative to said reel body and carrying a master gear and said handle;
   a driving shaft for driving said rotary frame, said driving shaft carrying a pinion engaging with said master gear, said driving shaft being driven responsive to rotation of said handle shaft;
   an anti-reverse-rotation gear means supported non-rotatably on said driving shaft for impeding reverse rotation of said driving shaft;
   a retaining pawl means pivotally supported to said reel body for detachable engagement with said anti-reverse-rotation gear means;
   a pawl control member supported rotatably on said driving shaft and including (i) an impeding portion for impeding said retaining pawl means from engaging with said anti-reverse-rotation gear means, (ii) an engagement-allowing portion for allowing said retaining pawl means to engage with said anti-reverse-rotation gear means and (iii) an engaging projection;
   a friction means for enabling said pawl control member to rotate substantially in concert with rotation of said driving shaft during at least a portion of a complete revolution of said driving shaft;
   an operating means supported movably to said reel body for changing positions of said impeding portion and said engagement-allowing portion of said pawl control member with respect to said retaining pawl means, said operating means being positioned at a bottom wall of said reel body near a side wall of said reel body and comprising (i) an abutting portion which abuts against said engaging projection of said pawl control member and (ii) an operating portion which projects outwardly from said reel body; and
   a regulation means, cooperating with said engaging projection, for regulating a rotation range of said pawl control member.

2. The spinning reel as in claim 1, wherein said side wall of said reel body and said abutting portion of said operating means provide said regulation means for regulating a rotation range of said pawl control member.

* * * * *